United States Patent [19]

Yamaoka et al.

[11] Patent Number: 5,045,845

[45] Date of Patent: Sep. 3, 1991

[54] IMAGE PROCESSING APPARATUS

[75] Inventors: Shigemitsu Yamaoka; Kenji Iwamoto, both of Hamamatsu, Japan

[73] Assignee: Yamaha Corporation, Japan

[21] Appl. No.: 114,571

[22] Filed: Oct. 29, 1987

[30] Foreign Application Priority Data

Oct. 31, 1986 [JP] Japan ................................ 61-259804

[51] Int. Cl.[5] ................................................ G06F 3/153

[52] U.S. Cl. ...................................... 340/726; 340/750

[58] Field of Search ............... 340/750, 748, 724, 723, 340/798, 799, 726

[56] References Cited

U.S. PATENT DOCUMENTS 3,593,316 7/1971 Frieband ............................ 340/750

4,611,120 9/1986 DiNitto et al. ..................... 340/750

*Primary Examiner*—Alvin E. Oberley

*Attorney, Agent, or Firm*—Scully, Scott, Murphy & Presser

[57] ABSTRACT

An image processing apparatus sequentially reads image data corresponding to an area to be displayed from an image memory by use of an access address. This image memory stores the image data corresponding to the display area and other image data for other uses. The access address for the image memory is determined by the image processing apparatus such that the access address is increased from the predetermined start address in response to a scanning of a display screen. When the access address reaches at a predetermined boundary address representative of an address of the last image data corresponding to the display area of the image memory, the access address jumps to a predetermined jump destination address (such as the start address). Hence, the display will be started from the jump destination address, whereby the other image data can be prevented from being used for the display or from being destructed.

1 Claim, 3 Drawing Sheets

IMAGE PROCESSING APPARATUS

BACKGROUND OF THE INVENTION

1. Field of the Invention

The present invention generally relates to image processing apparatuses, and more particularly to an image processing apparatus which processes image data so as to display an image corresponding to the processed image data on a screen of a CRT display unit.

2. Prior Art

The conventional display controller sequentially reads image data from a video random access memory (VRAM) in accordance with a scanning operation of a display screen of a display unit, and the display controller displays each dot on the display screen based on the image data. In this case, the VRAM provides a display area corresponding to the display screen and a data area for storing character data and data of a cursor pattern and the like. The access is given to only the display area at a display period and at a period when the image is rewritten on the display screen.

FIG. 1 shows a memory map of a general VRAM. In FIG. 1, e2 designates a display area, and e1 and e3 designate the display areas for storing other data. In this case, the display area e2 consists of display areas e2*a* and e2*b* each corresponding to one screen image. In other words, the display area e2 corresponds to two screen images.

In the case where the image data are read from a head address Adx1 of the display area e2*a*, a number of reading addresses is increased in accordance with the scanning operation of the display screen. Thereafter, when a number of accesses becomes equal to a number of rasters (or a number of rows on the display screen), the reading address returns to the head address Adx1 again so as to display an image depending on contents of the image data stored in the display area e2*a* on the display screen. In addition, when a scrolling is performed, the reading head address is rewritten by one raster or by one row on the display screen. Furthermore, when a paging is performed, the reading head address is rewritten to a head address Adx2 of the display area e2*b*. Incidentally, in the case where the display area e2 consists of many display areas each storing one screen image, the process similar to the above-mentioned process will be performed.

Meanwhile, in the case where the reading head address is set to an address Adx3 the value of which is larger than that of an address Adx2, the reading address is increased by predetermined number of rasters (or rows) from the address Adx3. In this case, an access area must advance to the data area e3 next to the display area e2. Hence, the conventional image processing apparatus suffers a disadvantage in that the image processing apparatus must use the data which must not be used for displaying. In addition, a shifted area e2*bs* is used as the display area. Hence, the conventional apparatus suffers a problem in that the data stored in the data area e3 must be damaged, even when the data stored in the display area are rewritten.

SUMMARY OF THE INVENTION

It is therefore a primary object of the invention to provide an image processing apparatus which should not display an error image corresponding to the data stored in the area other than the display area on the display screen of the display unit.

It is another object of the invention to provide an image processing apparatus which should not destruct the data stored in the area other than the display area by accident.

In a first aspect of the invention, there is provided an image processing apparatus comprising: (a) first memory means for storing boundary data set by the central processing unit; (b) coincidence detecting means for detecting that an access address for the image memory coincides with a boundary access designated by the boundary data; (c) second memory means for storing an arbitrarily set address of the display area as a jump destination address; and (d) jump control means for jumping the access address for the image memory to the jump destination address when the coincidence detecting means detects that the access address coincides with the boundary access.

In a second aspect of the invention, there is provided an image display system comprising: (a) video memory means having a display area for storing image data corresponding to an image to be displayed; (b) first a central processing unit; (c) image processing means for generating an access address for the video memory means under a control of the central processing unit, the access address being jumped to a predetermined jump destination address when the access address coincides with a predetermined boundary address of the display area within the video memory means; and (d) display means for sequentially reading the image data from the video memory means based on the access address of the image processing means so as to display an image corresponding to read image data on a screen of a display unit.

In a third aspect of the invention, there is provided an image processing apparatus comprising: (a) first detecting means for outputting a first detection signal at a timing when one line constituted by predetermined number of rasters is completely scanned; (b) second detecting means for outputting a second detection signal at a timing when one frame is completely scanned; (c) third detecting means for outputting a third detection signal at a timing when an access address for the image memory coincides with a boundary address designated by predetermined boundary data; (d) initial address setting means for outputting the last address of a precedingly displayed line on the display screen as an initial address when the first detection signal is outputted from the first detecting means, the initial address setting means outputting a predetermined start address as the initial address when the second detection signal is outputted from the second detecting means, and the initial address setting means outputting a predetermined jump destination address as the initial address when the third detection signal is outputted from the third detecting means; and (e) counter means for counting a count value thereof from a value of the initial address set by the initial address setting means, and the counter means outputting the count value thereof as the access address for the image memory.

BRIEF DESCRIPTION OF THE DRAWINGS

Further objects and advantages of the present invention will be apparent from the following description, reference being had to the accompanying drawings wherein a preferred embodiment of the present invention are clearly shown.

In the drawings.

DESCRIPTION OF THE PREFERRED EMBODIMENT

Description will be given with respect to [I] CONSTITUTION OF EMBODIMENT and [II] OPERATION OF EMBODIMENT in series.

[I] CONSTITUTION OF EMBODIMENT

Figure 2:
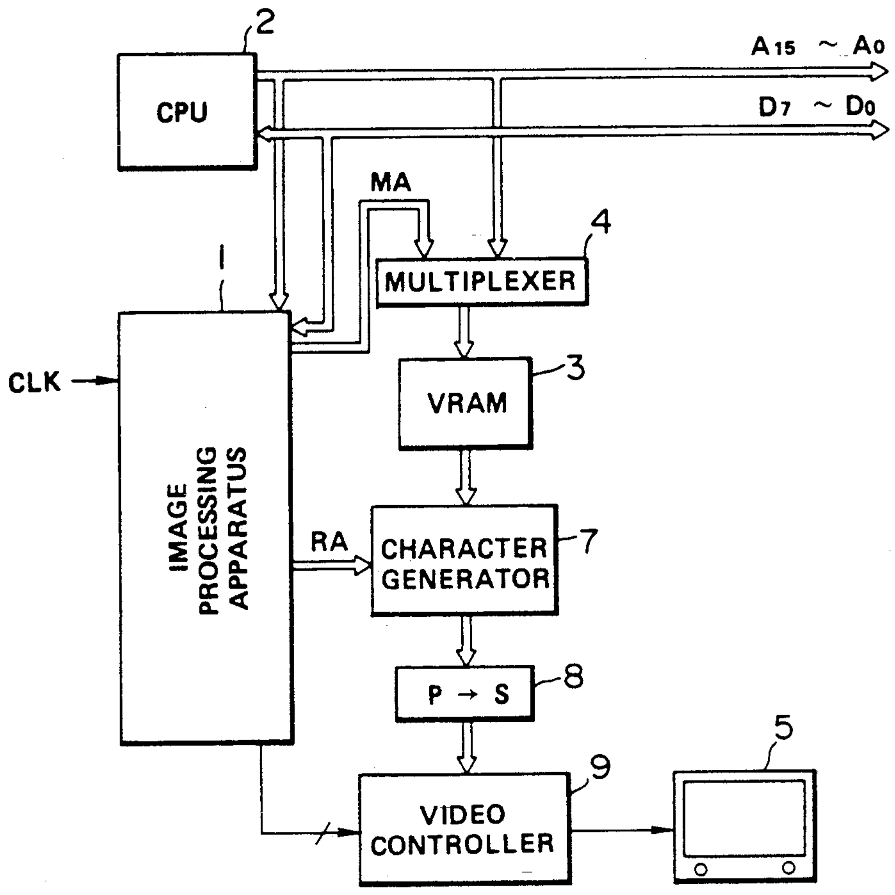
FIG. 2 is a block diagram showing an embodiment of an image display system employing the image processing apparatus according to the present invention.

FIG. 2 is a block diagram showing a whole constitution of an image display system employing an embodiment of the image processing apparatus according to the present invention. This embodiment shows the image processing apparatus which is applied to a character display unit.

In FIG. 2, an image processing apparatus 1 reads image data (i.e., a character code) from a VRAM 3 under a control of a central processing unit (CPU) 2 and displays an image corresponding to the read image data on a screen of a CRT display unit 5. A multiplexer 4 selects one of the image processing apparatus 1 and the CPU 2 which gives access to the VRAM 3. In addition, a character generator 7 outputs dot data constituting a character pattern based on the character code (supplied from the VRAM 3) and a raster address RA (supplied from the image processing apparatus 1).

Figure 3:
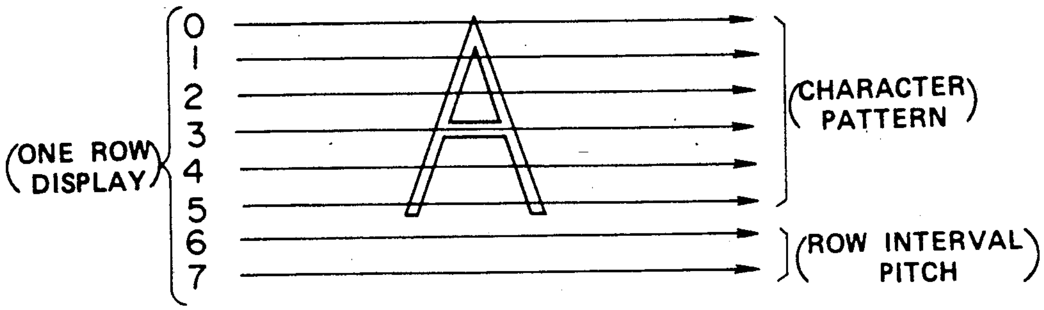
FIG. 3 shows an image displayed on the display screen for explaining a relation between a character pattern and a raster address.

Next, description will be given with respect to the raster address RA. In FIG. 3, numerals of 0-raster to 7-raster represent raster addresses when eight rasters are used for performing a one-row (including a row interval pitch) display. In this case, dot number of the character pattern in a vertical direction is identical to six, so that the character generator 7 does not need the 6-raster and the 7-raster and only the rasters are displayed at the 6-raster and the 7-raster.

Next, a parallel-to-serial (P/S) converter 8 converts the parallel dot data into serial pattern data, and such serial pattern data are supplied to a video controller 9. Hence, the video controller 9 displays an image corresponding to the serial pattern data on the screen of the CRT display unit 5 based on control signals (i.e., a synchronizing signal and a dot clock pulse and the like) supplied from the image processing apparatus 1.

Figure 4:
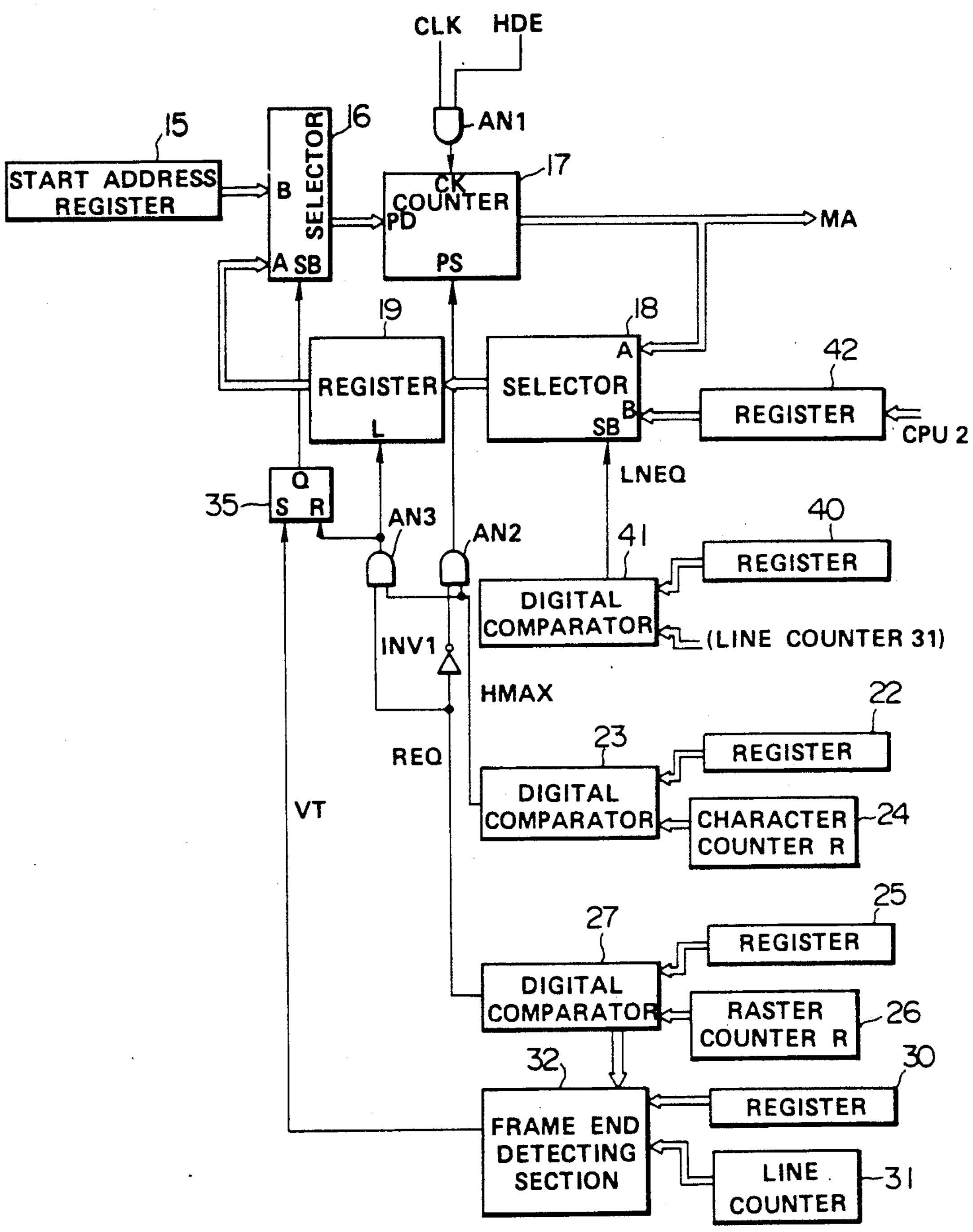
FIG. 4 is a block diagram showing an embodiment of an essential portion of the image processing apparatus according to the present invention.

Next, description will be given with respect to a constitution of an essential portion of the circuit shown in FIG. 2 in conjunction with FIG. 4. More specifically, FIG. 4 shows a circuit which is provided in the image processing apparatus 1. The CPU 2 writes an access start address for the VRAM 3 in a start address register 15 shown in FIG. 4. The start address register 15 outputs data to an input terminal B of a selector 16, and output data of the selector 16 are supplied to a preset data input terminal PD of a counter 17. This selector 16 selects the input terminal B thereof when a "1" signal (i.e., a signal having a logical level "1") is supplied to a terminal SB thereof, and this selector 16 selects an input terminal A thereof when a "0" signal (i.e., a signal having a logical level "0") is supplied to the terminal SB thereof. In addition, a clock pulse CLK (having a cycle corresponding to a period for displaying one character) is supplied to a clock input terminal CK of the counter 17 via an AND gate AN1. The AND gate AN1 is opened when a signal HDE becomes identical to the "1" signal. This signal HDE is controlled to be the "1" signal in a horizontal display period.

The counter 17 outputs memory address data MA to an address input terminal of the VRAM 3 and an input terminal A of a selector 18. Similar to the selector 16, the selector 18 selects an input terminal B thereof when the "1" signal is supplied to a terminal SB thereof, and the selector 18 selects the input terminal A thereof when the "0" signal is supplied to the terminal SB thereof. In addition, a register 19 latches output data of the selector 18 when the "1" signal is supplied to a load terminal L thereof, and output data of the register 19 are supplied to the input terminal A of the selector 16.

Meanwhile, the CPU 2 writes data (of total character number in the horizontal direction of the display screen) in a register 22. The above total character number represents a number which is obtained by adding a character number of the display screen with another character number corresponding to a horizontal blanking period (i.e., a number of characters which can be displayed in the horizontal blanking period). More specifically, a value of data stored in the register 22 represents a number of characters which can be displayed in a one raster period (i.e., in a horizontal scanning period). Next, a character counter 24 converts the horizontal scanning period into the character number and counts such character number. A digital comparator 23 detects whether a value of output data of the character counter 24 coincides with that of the register 22 or not. The digital comparator 23 sets an output signal HMAX thereof to the "1" signal when the value of output data of the character counter 24 coincides with that of the register 22. Hence, the signal HMAX has a "1" level while one character is displayed at an end timing of the horizontal scanning. This signal HMAX is supplied to respective one terminals of AND gates AN2 and AN3. In addition, the character counter 24 is reset at each time when one raster scanning is completed.

Next, a register 25 stores data representative of the number of rasters (including the rasters at the row interval pitch) corresponding to one row of the display screen, and such number is set by the CPU 2. In addition, a raster counter 26 counts the value of rasters displayed on the display screen. A digital comparator 27 detects whether a value of output data of the register 25 coincides with that of the raster counter 26 or not. The digital comparator 27 sets an output signal REQ thereof to the "1" signal when the value of output data of the register 27 coincides with that of the raster counter 26. This signal REQ is supplied to respective other terminals of the AND gates AN2 and AN3 via an inverter INV1. The output signal of the AND gate AN2 is supplied to a preset terminal PS of the counter 17, and the output signal of the AND gate AN3 is supplied to the load terminal L of the register 19 and a reset terminal R of a reset-set (R-S) flip-flop 35 as well. The raster counter 26 is reset just before the last raster is completed. When the last raster is completed in each row of the display screen, the signals REQ and HMAX first rises up to the "1" signals, next, the signal REQ falls down to the "0" signal but the signal HMAX is maintained at the "1" signal, and lastly, only the signal HMAX is maintained at the "1" signal.

Meanwhile, a register 30 stores data representative of a number of lines (hereinafter, one line will represent one row of the display screen) displayed in one display screen, and such number is set by the CPU 2. In addition, a line counter 31 counts the number of lines displayed on the display screen. Both of respective output data of the register 30 and the line counter 31 are supplied to a frame end detecting section 32 wherein a one frame end timing is detected based on respective output signals of the digital comparator 27, the register 30 and the line counter 31 and a number of lines displayed in a vertical blanking period as well. This frame end detecting section 32 sets an output signal VT thereof to the "1" signal at a timing when the last raster is scanned on the display screen. This signal VT is supplied to a terminal S of the flip-flop 35. Incidentally, the line counter 31 is reset at each time when one frame is completed.

Meanwhile, a register 40 stores a line number at which the access must be jumped. A digital comparator 41 compares a value of output data of the register 40 with that of the line counter 31, and the digital comparator 41 sets an output 7 signal LNEQ thereof to the "1" signal when the digital comparator 41 detects that the value of output data of the register 40 coincides with that of the line counter 31. Lastly, the CPU 2 writes a jump destination address (in the case where the access to the VRAM 3 is jumped) into a register 42.

[II] OPERATION OF EMBODIMENT

Next, description will be given with respect to an operation of the present embodiment.

Figure 1:
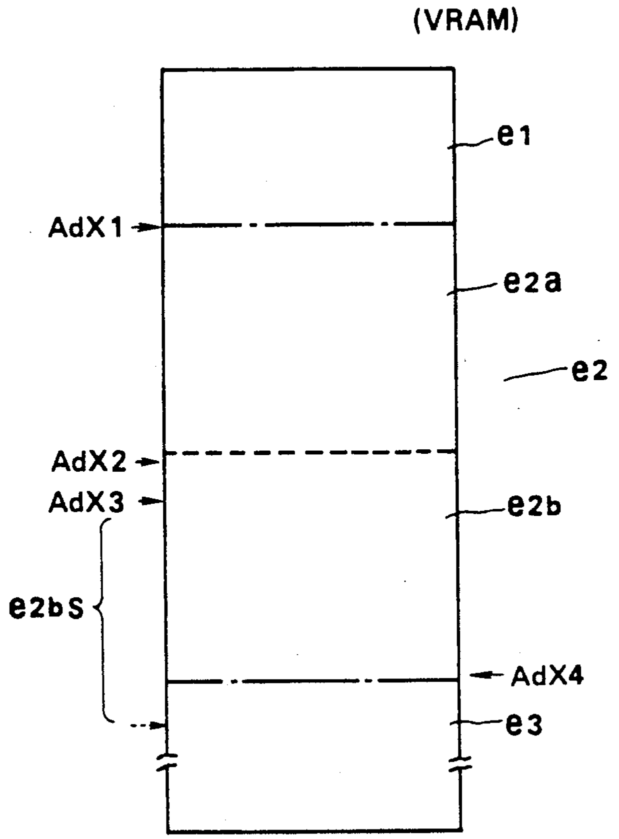
FIG. 1 shows a memory map showing an example of the display area of the VRAM.

The present embodiment employs a display of 40-character ×16-row, for example. In the present embodiment, the start address Adx1 (shown in FIG. 1) is set, and one row on the display screen is set to have eight rasters. In this case, the CPU 2 writes the address data (Adx1) into the start address register 15. Similarly, the CPU 2 writes a value "39" into the register 22, the CPU 2 writes a value "7" into the register 25, and the CPU 2 writes a value "15" into the register 30. In addition, the register 40 is written by a certain value which is larger than a number of displaying rows.

In the above-mentioned state, the digital comparators 23 and 27 output respective "1" signals in response to a scanning of the display screen at predetermined timings. Thereafter, the scanning will be performed on the last raster of the display screen, and furthermore, the last raster in the vertical blanking period (i.e., the last raster of one frame) will be scanned. At this time, the output signal VT of the frame end detecting section 32 rises up to the "1" signal, whereby the flip-flop 35 is set. Hence, the selector 16 selects the input terminal B thereof, so that the address data Adx1 stored in the start address register 15 are supplied to the preset data input terminal PD of the counter 17.

Next, the raster counter 26 is reset just before the last raster is scanned, so that the output signal REQ of the digital comparator 27 falls down to the "0" signal. In addition, the output signal HMAX of the digital comparator 23 rises up to the "1" signal at a timing when the last raster is completely scanned. As a result, both of the signal HMAX and the output signal of the inverter INV1 turn to the "1" signals so that the AND gate AN2 outputs the "1" signal. Due to such "1" signal outputted from the AND gate AN2, the counter 17 starts to store preset data therein. At this time, in other words, the start address Adx1 is preset to the counter 17.

Next, the signal HDE rises up to the "1" signal so that a 0-row is displayed on the display screen in a horizontal display period after a scanning of a next frame is started. At this time, the AND gate AN1 is opened so that the clock pulse CLK is supplied to the clock terminal CK of the counter 17 via the AND gate AN1. As a result, the counting value of the counter 17 will be sequentially increased by one from the value of the start address Adx1 in synchronism with the clock pulse CLK. Thus, the VRAM 3 sequentially outputs the character codes representative of characters to be displayed at each display segment of the display screen, and the character generator 7 reads out the character pattern corresponding to the character code. Since the value of the raster address equals to "0" in this state, the above character pattern represents the pattern data corresponding to the raster address "0" (as shown in FIG. 3). Therefore, the character generator 7 outputs the parallel pattern data of the raster address "0" to the P/S converter 8 wherein the parallel pattern data are converted into the serial pattern data and such serial pattern data are supplied to the video controller 9. Thus, the CRT display unit 5 displays a certain image based on the dot clock pulse outputted from the video controller 9.

As described heretofore, the display of the raster address "0" is completed. At such raster scanning end timing, the signal HMAX rises up to the "1" signal, whereby the output signal of the AND gate AN2 turns to the "1" signal so that the counter 17 performs a preset operation again. In this state, the selector 16 selects the input terminal B thereof, hence, the start address Adx1 is preset to the counter 17. In the present horizontal display period, a display operation similar to that described before will be performed. In this case, the value of data stored in the raster counter 26 is sequentially increased by one, hence, the CRT display unit 5 will displays an image corresponding to the pattern data of the raster address "1". Thereafter, the CRT display unit 5 will sequentially displays images corresponding to the pattern data of the raster addresses "2", "3", . . .

Next, both of the signals REQ and HMAX turn to the "1" signals just before the scanning of the raster address "7" is completed after the display of such raster address "7" is completed. As a result, the AND gate AN3 outputs the "1" signal, so that the flip-flop 35 is reset and the register 19 starts to perform a loading operation thereof. At this time, the selector 18 selects the input terminal A thereof, hence, the register 19 loads the value of the memory address data MA at a display period ending timing of the raster address "7" (i.e., at a timing when the signal HDE falls down to the "0" signal). Next, the signal HMAX becomes the "1" signal but the signal REQ becomes the "0" signal at a timing when the scanning of the raster address "7" is completed, so that the AND gate AN2 outputs the "1" signal and the counter 17 starts to perform the preset operation. At this time, the selector 16 selects the input terminal A thereof since the flip-flop 35 is reset. As a result, the data preset in the counter 17 becomes identical to the address data loaded in the register 19. In addition, the signal HDE rises up to the "1" signal in a horizontal display period for a first row after a next scanning is started, so that the AND gate AN1 is subjected to an open state. As a result, the counter 17 starts to count up the counting value thereof. Therefore, a read-out operation is performed on the VRAM 3 from an address next to the last reading address of a preceding row sequentially. Based on such read data from the VRAM 3, a display process similar to that described before will be performed. When the display of the first row is completed, the preset value of the counter 17 will be renewed again before a display of a second row, whereby the access will be given to the VRAM 3 so as to sequentially read out the addresses therefrom.

As described heretofore, the display of each row will be sequentially performed. Thereafter, the display of one frame will be completed at an end timing of the last raster in the vertical blanking period after a display of a fifteenth row is completed. The output signal VT of the frame end detecting section 32 rises up to the "1" signal just before a frame end timing, whereby the flip-flop 35 is set. At this time, the selector 16 selects the input terminal B thereof, so that the start address Adx1 is supplied to the preset data input terminal PD of the counter 17. In addition, the signal REQ turns to the "0" signal and the signal HMAX turns to the "1" signal at the end timing of the last raster, so that the AND gate AN2 outputs the "1" signal and the counter 17 starts to perform the preset operation. As a result, the counting value of the counter 17 is sequentially increased from the value of the start address Adx1 after a display start timing of a next frame.

Thereafter, the above-mentioned operations will be repeatedly performed. Thus, the display screen will displays a character image based on the data stored in the VRAM 3.

Next, description will be given with respect to a scrolling and a paging and the like. In this case, the data stored in the start address register 15 must be rewritten. As a result, a display of sixteen rows is performed from a newly designated start address in accordance with the above-mentioned display process. For example, when the VRAM 3 provides a memory map shown in FIG. 1 and the address Adx2 is designated as the start address, the value of the access address is sequentially increased from the start address Adx2 so that the character codes of sixteen rows are read from the VRAM 3. Thus, the access will be given to the last address of the display area e2*b*.

Next, description will be given with respect to the case where the address Adx3 (or the address after the address Adx3) is designated as the start address. When the access of one screen image is given to the VRAM 3 in such case, the access must cross over the display area e2*b*, whereby the display must be performed on the display screen based on the other data which are not to be displayed. In order to avoid such display, the present embodiment according to the present invention performs the following operation which will be described hereinafter.

Since the CPU 2 recognizes the memory map of the VRAM 3, the CPU 2 can predict that the access crosses over the display area e2*b* when the address after the address Adx3 is designated. In addition, the CPU 2 can detect the line number at which the access crosses over the display area e2*b*. Hence, the CPU 2 writes the last line number of the display area e2*b* into the register 40 (shown in FIG. 1) when the CPU 2 writes the start address. After the access has been given to all of the addresses of the display area e2*b*, the CPU 2 writes the access address into the register 42 as the jump destination address.

Due to the above-mentioned setting operations for the registers, the output signal LNEQ of the digital comparator 41 rises up to the "1" signal when the line number of the last line displayed on the display screen coincides with the line number of data stored in the register 40, whereby the selector 18 selects the input terminal B thereof. As a result, the register 42 outputs the address data to the input terminal of the register 19. In addition, both of the signals REQ and HMAX become identical to the "1" signals just before the last raster of the present line is scanned on the display screen, hence, the register 19 loads the jump destination address. Next, at a timing when the last raster is completely scanned, the signal REQ falls down to the "0" signal but the signal HMAX is maintained at the "1" signal. Hence, the value of the jump destination address is preset to the counter 17. As a result, a line next to the present line will be scanned by sequentially giving the access to the addresses started from the jump destination address.

In the case where the head address Adx1 of the display area e2 (shown in FIG. 1) is written in as the jump destination address, the display is performed such that a first image is displayed from a certain middle line on the display screen. In this case, it is possible to obtain an effect as if the display areas are looped. Incidentally, it is possible to set other address of an arbitrarily selected display area as the jump destination address.

The present embodiment represents the present invention which is applied to the character display unit. However, it is possible to apply the present invention to a graphic display unit, for example.

In addition, the present embodiment judges whether the access should jump to the predetermined address or not in response to the lines on the display screen. Instead, it is possible to constitute the present invention such that the last address of the display area is stored in the register and the access jumps to the predetermined address when the actual access address coincides with such last address.

According to the present invention, since the access is compelled to be given to the predetermined address when the access crosses over the display area for the display, the data other than the data for the display can be prevented from being used for the display. In addition, the present invention can avoid a destruction or a rewriting of the data other than the data for the display.

This invention may be practiced or embodied in still other ways without departing from the spirit or essential character thereof as described heretofore. The preferred embodiment described herein is therefore illustrative and not restrictive, the scope of the invention being indicated by the appended claims and all variations which come within the meaning of the claims are intended to be embraced therein.

What is claimed is:

1. An image processing apparatus for sequentially reading image data corresponding to an area to be displayed from an image memory in accordance with a scanning of a display screen and for controlling a display based on read image data under a control of a central processing unit comprising:

(a) first detecting means for outputting a first detection signal at a timing when one line is constituted by predetermined number of rasters is completely scanned;

(b) second detecting means for outputting a second detection signal at a timing when one frame is completely scanned;

(c) third detecting means for outputting a third detection signal at a timing when an access address for said image memory coincides with a boundary address designated by predetermined boundary data;

(d) initial address setting means for outputting the last address of a precedingly displayed line on said display screen as an initial address when said first detection signal is outputted from said first detecting means, said initial address setting means outputting a predetermined start address as said initial address when said second detection signal is outputted from said second detecting means, and said initial address setting means outputting a predetermined jump destination address as said initial address when said third detection signal is outputted from said third detecting means;

(e) counter means for counting a count value thereof from a value of said initial address set by said initial address setting means, and said counter means outputting the count value thereof as said access address for said image memory; and (f) wherein said initial address setting means comprises (i) second memory means for storing data representative of said predetermined jump destination address therein, (ii) first selector means for selecting one of said access address outputted from said counter means and said predetermined jump destination address, said first selector means selecting said predetermined jump destination address when said third detection signal is outputted from said third detecting means, and (iii) second selector means for selecting one of said predetermined start address and the address outputted from said first selector means, said second selector means selecting said predetermined start address when said second detection signal is outputted from said second detecting means.

* * * * *

UNITED STATES PATENT AND TRADEMARK OFFICE
CERTIFICATE OF CORRECTION

PATENT NO. : 5,045,845

DATED : September 3, 1991

INVENTOR(S) : Shigemitsu Yamaoka, et al.

It is certified that error appears in the above-identified patent and that said Letters Patent is hereby corrected as shown below:

Column 5, line 24: after "outpost" delete --7--

Column 8, line 66: after "line" delete --is--

Signed and Sealed this

Twenty-second Day of December, 1992

*Attest:*

DOUGLAS B. COMER

*Attesting Officer* *Acting Commissioner of Patents and Trademarks*